(12) United States Patent
Kao

(10) Patent No.: US 7,922,447 B2
(45) Date of Patent: Apr. 12, 2011

(54) FAN BEARING STRUCTURE

(76) Inventor: Ming-Shing Kao, Kaohsiung (TW)

( * ) Notice: Subject to any disclaimer, the term of this patent is extended or adjusted under 35 U.S.C. 154(b) by 930 days.

(21) Appl. No.: 11/781,959

(22) Filed: Jul. 24, 2007

(65) Prior Publication Data

US 2009/0028701 A1    Jan. 29, 2009

(51) Int. Cl.
*F04D 29/05* (2006.01)
(52) U.S. Cl. .............. 415/229; 416/174; 310/90
(58) Field of Classification Search .......... 415/229, 415/216.1; 416/174, 244 R; 417/424.1
See application file for complete search history.

(56) References Cited

U.S. PATENT DOCUMENTS

| 6,720,694 | B2 * | 4/2004 | Horng et al. | 310/90 |
| 7,510,331 | B2 * | 3/2009 | Hong et al. | 310/90 |

FOREIGN PATENT DOCUMENTS

| JP | 05149314 A | * | 6/1993 |
| JP | 2000014080 A | * | 1/2000 |

* cited by examiner

*Primary Examiner* — Richard Edgar

(57) ABSTRACT

A highly stable and durable fan bearing structure practical for small electronic device application is disclosed to include a bearing block, which has a stepped hub defining a vertically extending axle hole and an inside annular flange inside the axle hole at a distance away from the top opening of the axle hole, a fan blade assembly, which has permanent magnets mounted in a hollow base block thereof and an axle suspending in the hollow base block and inserted into the axle hole and coupled to the inside annular flange of the stepped hub and kept in coincidence with the central axis of the axle hole, and a stator module accommodated in the hollow base block of the fan blade assembly for acting against the permanent magnets to cause rotation of the fan blade assembly upon connection of an electric current.

13 Claims, 9 Drawing Sheets

FAN BEARING STRUCTURE

BACKGROUND OF THE INVENTION

1. Field of the Invention

The present invention relates to an electric fan and more specifically, to fan bearing structure in which the stepped hub has an inside annular flange for the coupling of the axle of the fan blade assembly to keep the axle in coincidence with the central axis of the axle hole of the stepped hub of the bearing block for smooth and stable rotation without noises.

2. Description of the Related Art

Following fast development of high technology, electronic devices are created having the characteristic of small size and high performance. In these electronic devices, small electronic components are installed in a limited area. In consequence, a big amount of heat energy is produced during the operation of a high-performance electronic device. Excessive high temperature may cause electronic ionization and thermal stress, resulting in low stability of the electronic device. Therefore, it is important to dissipate heat during the operation of an electronic device. Normally, a cooling fan and a heat sink are directly installed in an electronic device for quick dissipation of heat.

Therefore, using a fan to dissipate heat from, for example, a CPU has become a requisite measure. A fan general uses a bearing to support the axle of the fan blade assembly, allowing rotation of the fan blade assembly at a high speed. Therefore, a bearing for this purpose must have the features of long working life, low noise level, low power loss and excellent heat dissipation effect. To achieve these objects, an excellent lubrication effect between the bearing and the axle of the fan blade assembly is needed. Excellent lubrication effect between the bearing and the axle of the fan blade assembly lowers friction during rotation of the axle relative to the bearing. Therefore, lubricating oil is commonly used and applied to the bearing and axle of a fan. However, lubricating oil may leak out of the bearing or evaporate if the fan is turned upside down or kept in a horizontal position during packing or delivery of the fan. Further, dust or impurities may enter a gap between the bearing and the axle, causing friction between the bearing and the axle during rotation of the axle. Friction between the bearing and the axle during rotation of the axle results in noises and vibration of the fan blade assembly.

FIGS. 8 and 9 show a fan bearing structure according to the prior art. According to this design, the bearing A has a body A1, an expanded base A2 at the bottom side of the body A1, an axle hole A3 at the center of the body A1, and a plurality of hooks A4 at the top side of the body A1 around the axle hole A3. The hooks A4 each have a protruding portion A5. After insertion of the axle B1 of the fan blade assembly B into the axle hole A3, the protruding portions A5 of the hooks A4 are forced by the springy power of the material of the hooks A4 into engagement with the annular groove B2 around the periphery of the axle B1, thereby holding the axle B1 to the bearing A and allowing rotation of the fan blade assembly B relative to the bearing A.

The aforesaid fan bearing structure is still not satisfactory in function because of the following drawbacks:

1. The bearing A must have a certain height for receiving the axle B1 and supporting rotation of the axle B1. The design of the hooks A4 further increases the height of the bearing A. To fit the height of the bearing A, the length of the axle B1 is relatively increased. Thus, the fan blade assembly B cannot have a low profile for use in an electronic device having light, thin and small characteristics.

2. Because the hooks A4 are disposed at the top side of the body A1 around the axle hole A3 and have the respective protruding portions A5 suspending in the axle hole A3, the hooks A4 may be permanently deformed or damaged accidentally during insertion of the axle B1 into the axle hole A3, and the axle B1 may be jammed in the axle hole A3 of the bearing A in case the hooks A4 are deformed or damaged.

3. The hooks A4 have a thin wall of low strength. The clamping force of the hooks A4 is low. During high-speed rotation of the axle B1, the axle B1 may escape from the constraint of the hooks A4 and may be unable to keep the axle B1 in vertical, causing vertical displacement of the fan blade assembly B relative to the bearing A or damage of the hooks A4.

4. Because the hooks A4 have a thin wall of low strength and provide a small clamping force. During high-speed rotation of the axle B1, the hooks A4 may be unable to keep the axle B1 in vertical, causing vibration of the fan blade assembly B, and vibration of the fan blade assembly B may damage the hooks A4.

5. The hooks A4 are disposed at the top side of the body A1 and spaced from one another around the axle hole A3. In case the hooks A4 are not accurately positioned or deformed accidentally, the axle B1 may rub against the hooks A4 during its high-speed rotation, causing noises or damage of the hooks A4.

Therefore, it is desirable to provide a fan bearing structure that eliminates the aforesaid problem.

SUMMARY OF THE INVENTION

The present invention has been accomplished under the circumstances in view. According to one aspect of the present invention, the fan bearing structure comprises a bearing block, which has a stepped hub defining a vertically extending axle hole and an inside annular flange inside the axle hole, a fan blade assembly, which has permanent magnets mounted in a hollow base block thereof and an axle suspending in the hollow base block and inserted into the axle hole and coupled to the inside annular flange of the stepped hub in spot contact with the bottom wall of the stepped hub inside the axle hole and kept in coincidence with the central axis of the axle hole, and a stator module accommodated in the hollow base block of the fan blade assembly for acting against the permanent magnets to cause rotation of the fan blade assembly upon connection of an electric current. This design has the feature of low profile, practical for use in an electronic device having light, thin and small characteristics.

According to another aspect of the present invention, the inside annular flange is disposed inside the axle hole at a distance away from the top opening of the axle hole such that when the axle of the fan blade assembly is inserted into the axle hole and coupled to the inside annular flange, the axle is stably coupled to the stepped hub for smooth and stable rotation relative to the stepped hub. Further, the stepped hub of the bearing block has vertical crevices that allows radial expansion of the stepped hub for accurate coupling of a neck of the axle to the inside annular flange of the stepped hub.

According to still another aspect of the present invention, in addition to the function of allowing radial expansion of the stepped hub upon insertion of the axle, the vertical crevices of the stepped hub facilitate mold stripping, preventing damage of the inside annular flange by the mold when stripping the mold during fabrication of the bearing block. By means of the design of the vertical crevices, the formation of the inside annular flange on the inside wall of the stepped hub is simple.

DETAILED DESCRIPTION OF THE PREFERRED EMBODIMENT

Figure 1:
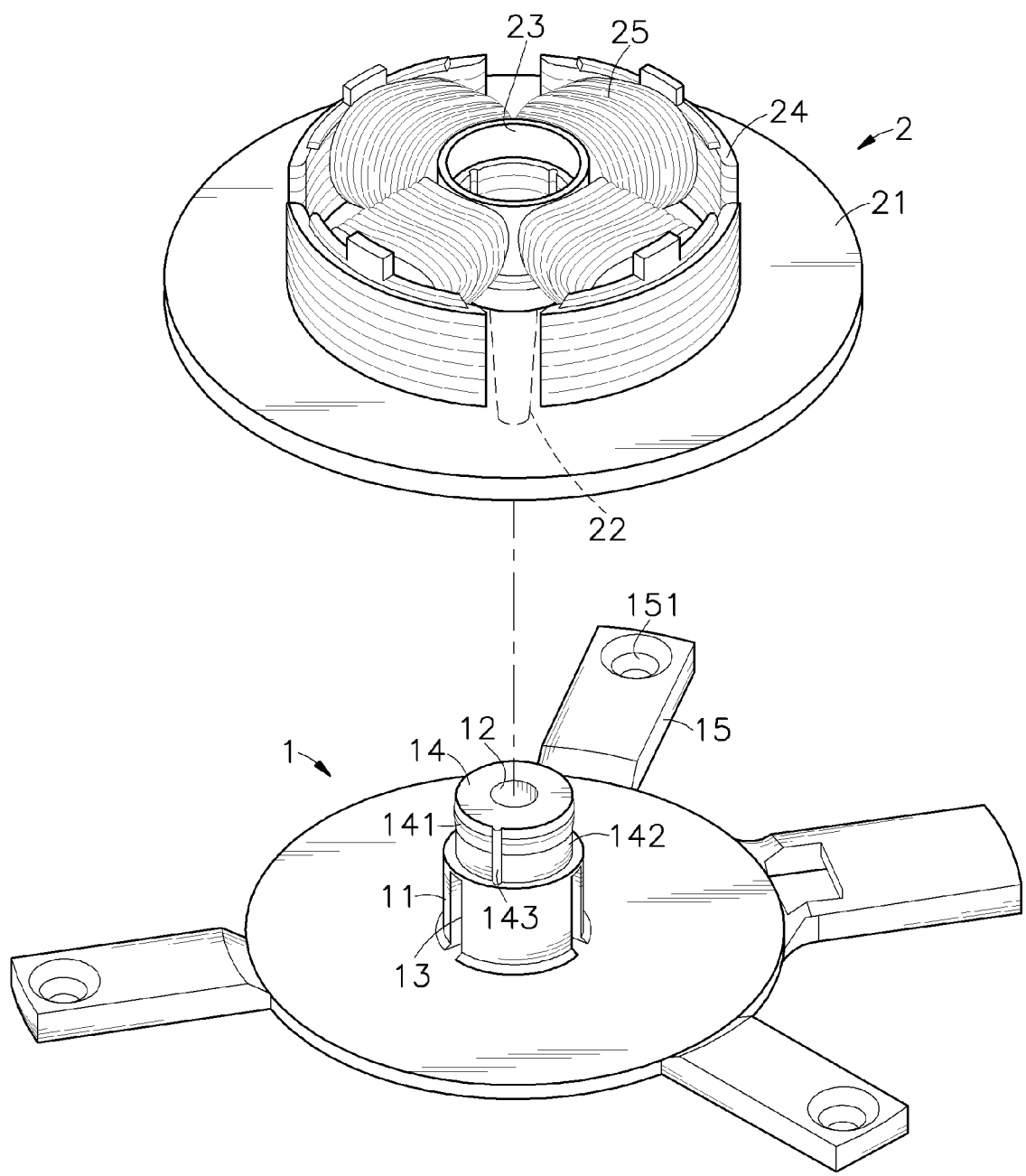
FIG. 1 is an exploded view of a part of a fan bearing structure in accordance with a first embodiment of the present invention.
Figure 2:
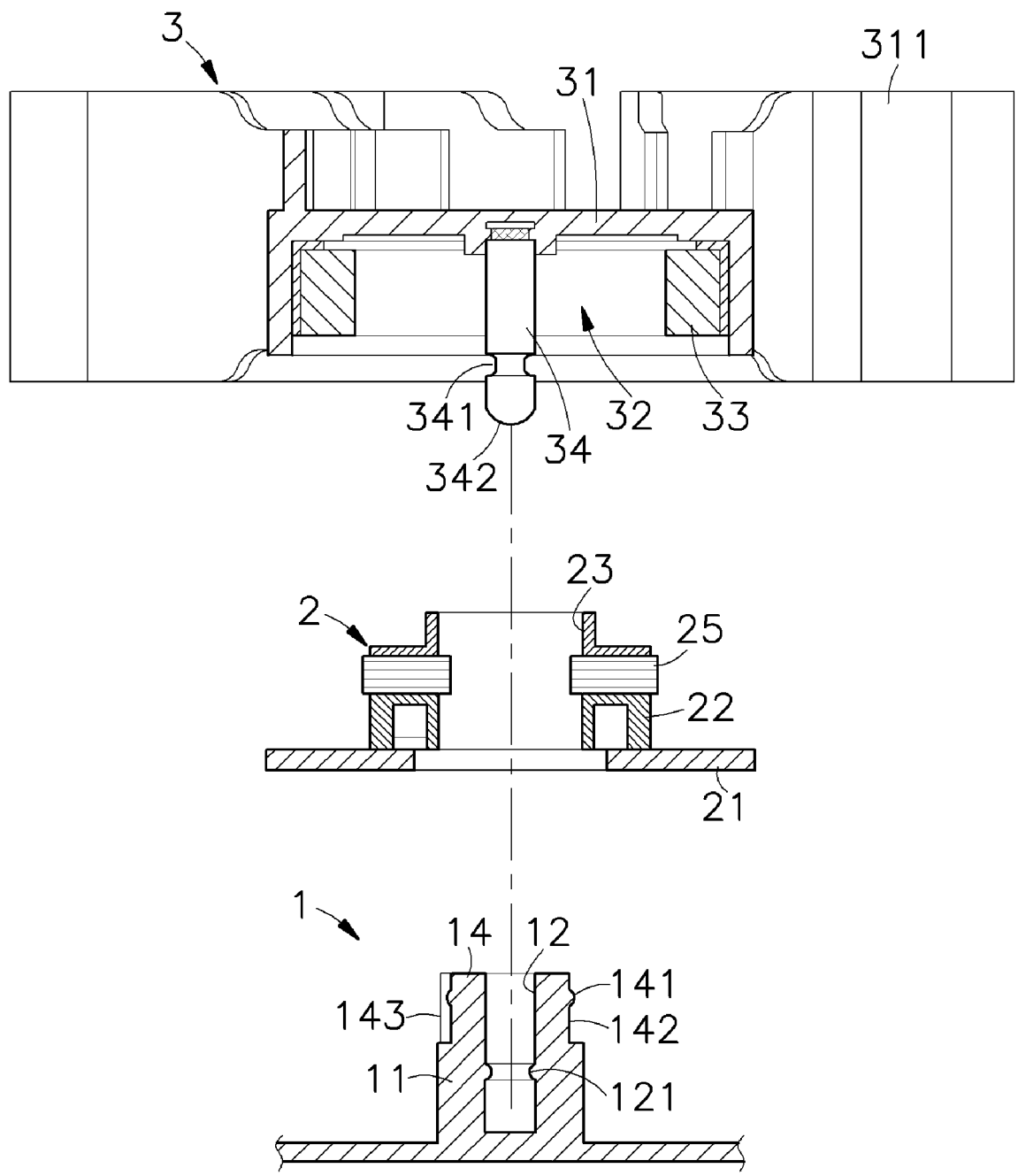
FIG. 2 is an exploded view in section of the fan bearing structure in accordance with the first embodiment of the present invention.
Figure 3:
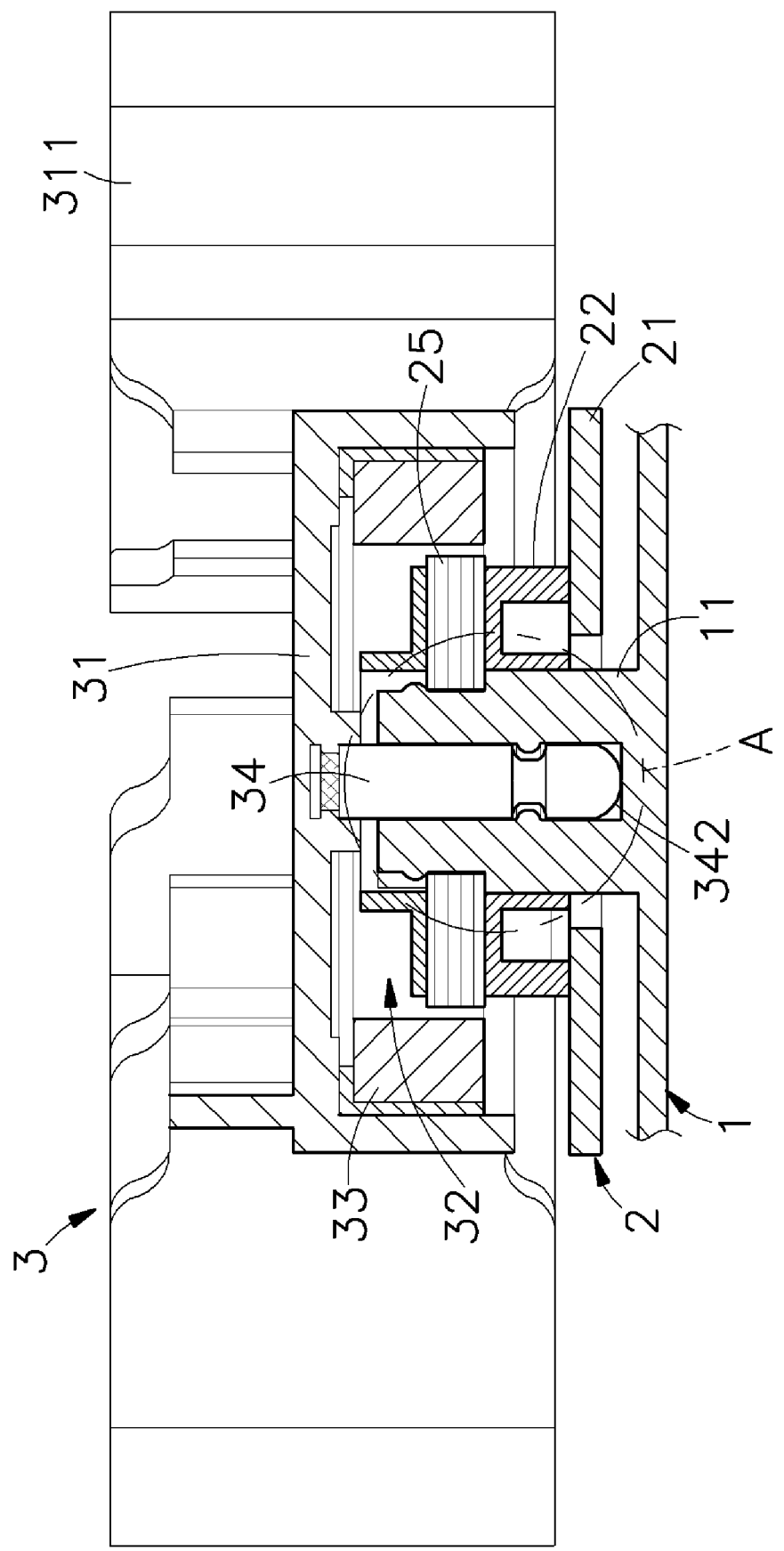
FIG. 3 is sectional assembly view of the fan bearing structure in accordance with the first embodiment of the present invention.
Figure 4:
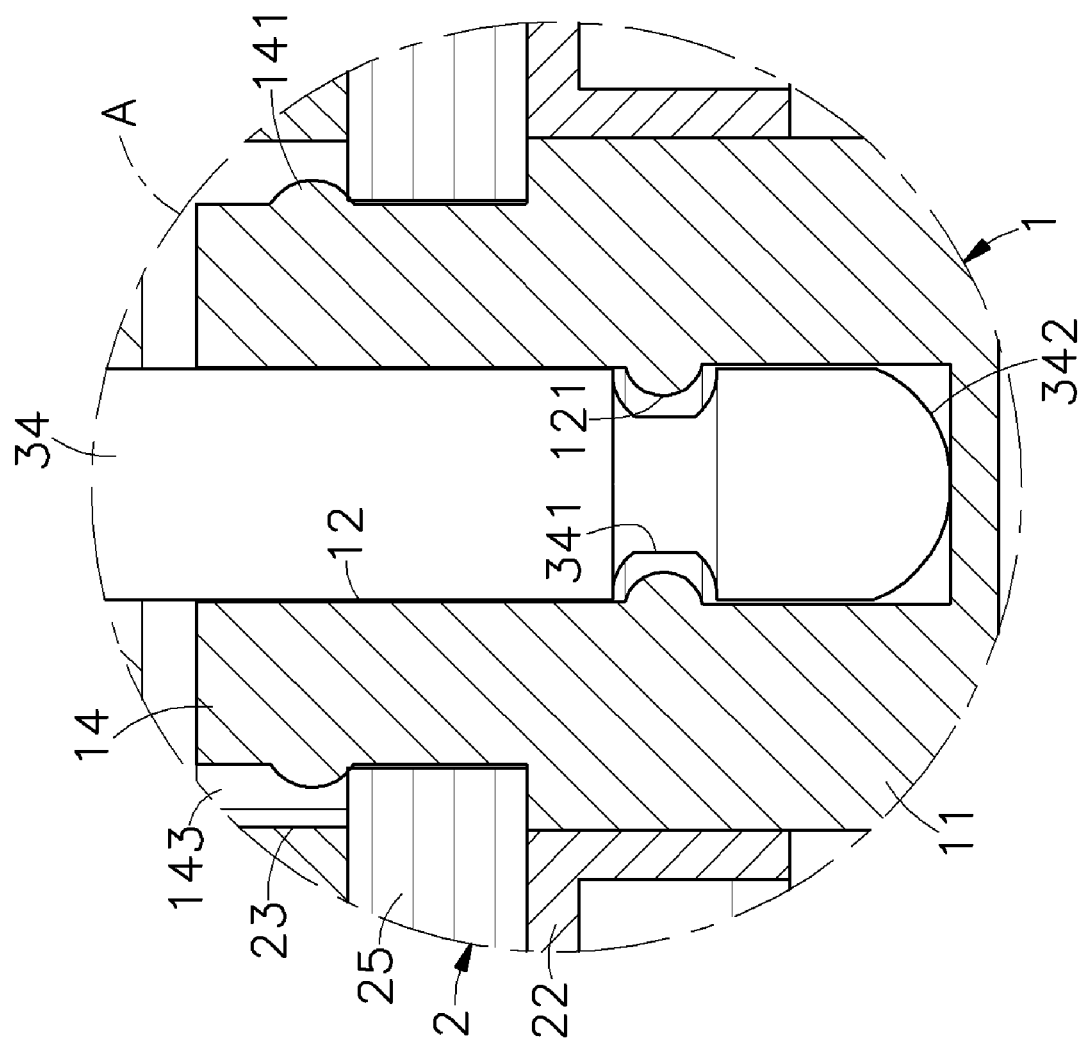
FIG. 4 is an enlarged view of a part of FIG. 3.

Referring to FIGS. 1~4, a fan bearing structure of an electric fan in accordance with the present invention is shown comprised of a bearing block 1, a stator module 2 and a fan blade assembly 3.

The bearing block 1 is made out of a porous, oil-containing and extensible plastic material, having a stepped hub 11 perpendicularly upwardly extending from the center of its top wall, and a plurality of mounting lugs 15 radially outwardly extending from its bottom side around the periphery. The stepped hub 11 has an axle hole 12 axially defined therein and extending to the topmost edge, an inside annular flange 121 extending around its inside wall within the axle hole 12 at a predetermined elevation, a plurality of vertical crevices 13 cut through its relatively bigger lower part in communication with the axle hole 12, an outside stop flange 141 extending around the periphery of its relatively smaller upper part 14, a coupling groove 142 extending around the periphery of its relatively smaller upper part 14 between the outside stop flange 141 and its relatively bigger lower part, and a plurality of vertical ribs 143 protruded from the periphery of its relatively smaller upper part 14. Further, each mounting lug 15 has a mounting through hole 151.

The stator module 2 comprises a circuit board 21, an electrically insulative bracket 22 fixedly provided at the top side of the circuit board 21, a through hole 23 vertically extending through the electrically insulative bracket 22 and the circuit board 21, a plurality of silicon steel plates 24 fastened to the outside wall of the electrically insulative bracket 22 and partially extended to the inside of the through hole 23, and a plurality of windings 25 wound on the silicon steel plates 24.

The fan blade assembly 3 comprises a hollow base block 31, a downwardly extending accommodation open chamber 32 defined within the hollow base block 31, a plurality of fan blades 311 radially extending from the hollow base block 31 and equiangularly spaced around the periphery of the hollow base block 31, magnetic devices, for example, permanent magnets 33 fixedly mounted inside the accommodation open chamber 32, and an axle 34 fixedly fastened to the hollow base block 31 and downwardly suspending in the accommodation open chamber 32 at the center. The axle 34 has rounded bottom end 342 and a neck 341 adjacent to the rounded bottom end 342.

During installation of the present invention, the stator module 2 is capped on the bearing block 1 to receive the stepped hub 11 in the through hole 23 and to have the silicon steel plates 24 be coupled to the coupling groove 142 of the stepped hub 11 and stopped at the bottom side of the outside stop flange 141 and prohibited from vertical displacement relative to the bearing block 1. At this time, the vertical ribs 143 of the bearing block 1 are stopped against the silicon steel plates 24 to stop the stator module 2 from rotation relative to the bearing block 1.

Thereafter, the fan blade assembly 3 is capped on the stator module 2 and the bearing block 1 to have the electrically insulative bracket 22 of the stator module 2 be received in the accommodation open chamber 32 with the permanent magnets 33 aimed at the windings 24 at the electrically insulative bracket 22 and to have the axle 34 be pivotally inserted into the axle hole 12 of the bearing block 1, and then the mounting through holes 151 of the mounting lugs 15 are affixed to the fan blade assembly 3. When inserting the axle 34 into the axle hole 12 of the stepped hub 11 during installation, the extensible material property of the bearing block 1 allows the rounded bottom end 342 of the axle 34 to be moved downwardly over the inside annular flange 121 to have the neck 341 of the axle 34 be coupled to the inside annular flange 121 and the rounded bottom end 342 of the axle 34 in spot-contact with the bottom wall of the stepped hub 11 inside the axle hole 12, thereby allowing rotation of the fan blade assembly 3 relative to the stator module 2 and the bearing block 1.

Further, the vertical crevices 13 of the stepped hub 11 allow radial expansion of the stepped hub 11 upon insertion of the axle 34, and facilitate mold stripping, preventing damage of the inside annular flange 121 by the mold when stripping the mold during fabrication of the bearing block 1. By means of the design of the vertical crevices 13, the formation of the inside annular flange 121 on the inside wall of the stepped hub 11 is simple.

By means of a spot contact between the rounded bottom end 342 of the axle 34 and the bottom wall of the bearing block 1 inside the axle hole 12 and the coupling between the inside annular flange 121 of the stepped hub 11 and the neck 341 of the axle 34, the axle 34 is constantly kept in coincidence with the central axis of the axle hole 12 of the stepped hub 11 of the bearing block 1, assuring smooth and stable rotation of the fan blade assembly 3 relative to the stator module 2 and the bearing block 1. Further, because the bearing block 1 is made out of a porous oil-containing plastic material, the bearing block 1 provides an oil film for protection between the axle 34 and the inside wall of the axle hole 12, preventing friction noises or friction heat during rotation of the fan blade assembly 3 relative to the stator module 2 and the bearing block 1. Therefore, the invention eliminates the drawbacks of the prior art design that requires a lubricating oil maintaining design and a sufficient supply of a lubricating oil, and achieves high rotation precision and high-speed rotation stability.

When an electric current passes through the silicon steel plates 24 and the windings 25 at the circuit board 21 of the stator module 2, the windings 25 induce a magnet field. By means of magnetic repelling action between the windings 25 and the permanent magnets 33, the fan blade assembly 3 is rotated relative to the stator module 2 and the bearing block 1.

By means of the coupling between the inside annular flange 121 of the stepped hub 11 and the neck 341 of the axle 34, the axle 34 is constantly kept in the coincidence with the central axis of the axle hole 12 of the stepped hub 11 of the bearing block 1, assuring smooth and stable rotation of the fan blade assembly 3 relative to the stator module 2 and the bearing block 1.

Figure 5:
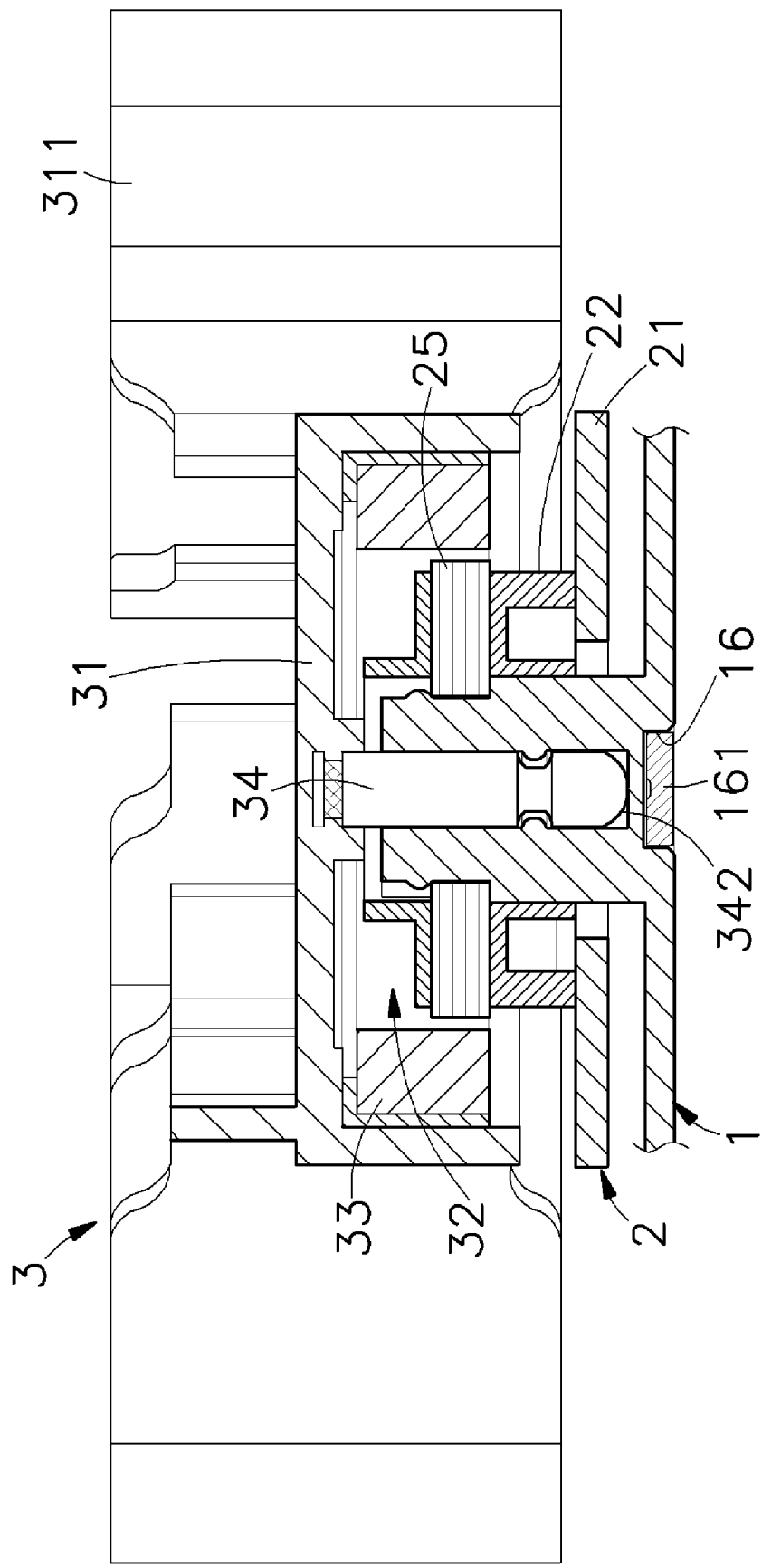
FIG. 5 is sectional side view of a fan bearing structure in accordance with a second embodiment of the present invention.

FIG. 5 is sectional side view of a fan bearing structure in accordance with a second embodiment of the present invention. According to this embodiment, the bearing block 1 has a bottom center recess 16 in vertical alignment with the axle hole 12, and a magnet 161 mounted in the bottom center recess 16 to attract the axle 34 in the axle hole 12, keeping the axle 34 constantly in coincidence with the central axis of the axle hole 12 of the stepped hub 11 of the bearing block 1 and assuring smooth and stable rotation of the fan blade assembly 3 relative to the stator module 2 and the bearing block 1.

Figure 6:
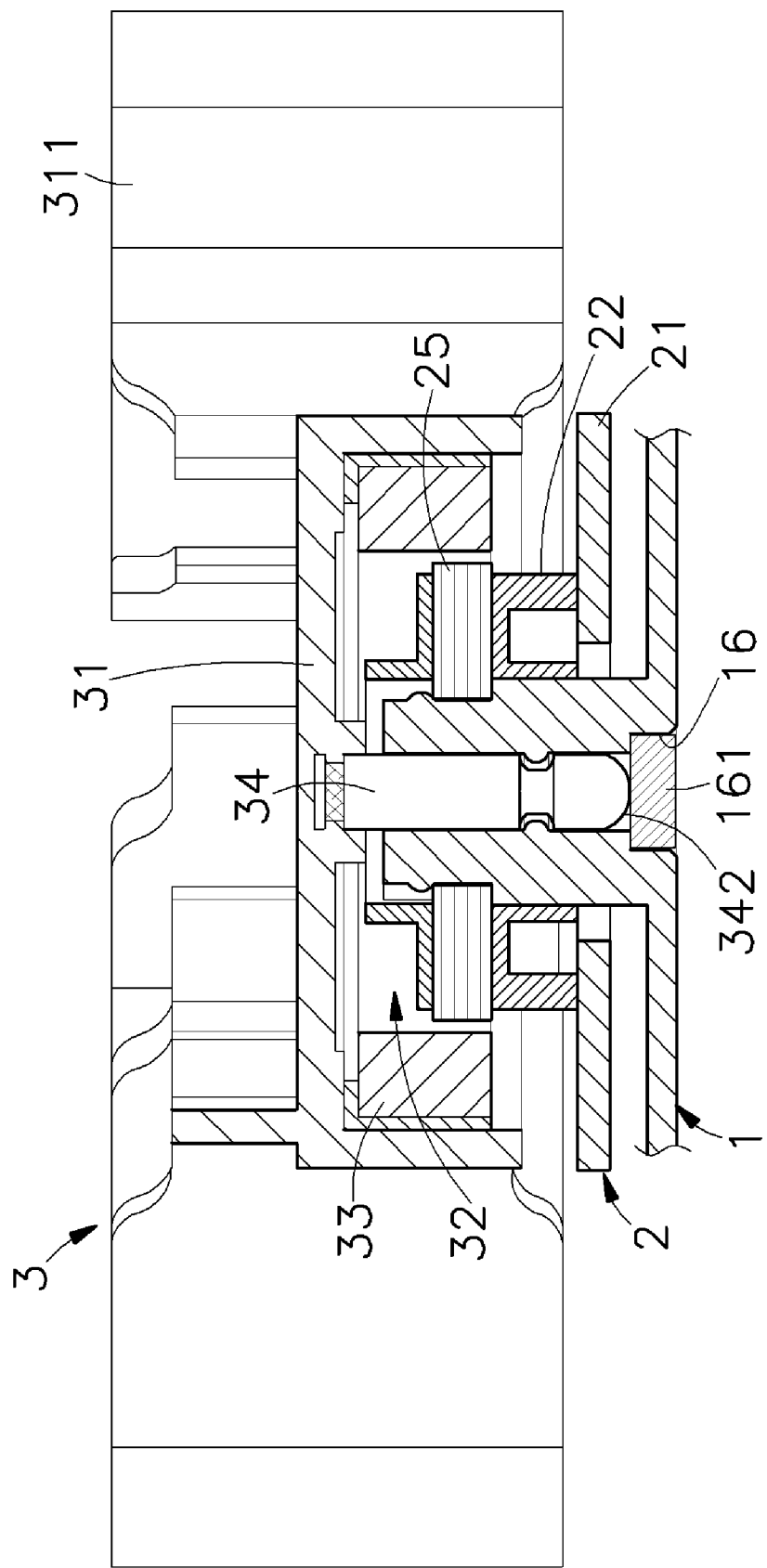
FIG. 6 is a sectional side view of a fan bearing structure in accordance with a third embodiment of the present invention.

FIG. 6 is a sectional side view of a fan bearing structure in accordance with a third embodiment of the present invention. This embodiment is substantially similar to the embodiment shown in FIG. 5, with the exception that the magnet 161 is directly mounted in the axle hole 12 at the bottom side to support and attract the rounded bottom end 342 of the axle 34, keeping the axle 34 constantly in coincidence with the central axis of the axle hole 12 of the stepped hub 11 of the bearing block 1 and assuring smooth and stable rotation of the fan blade assembly 3 relative to the stator module 2 and the bearing block 1.

Figure 7:
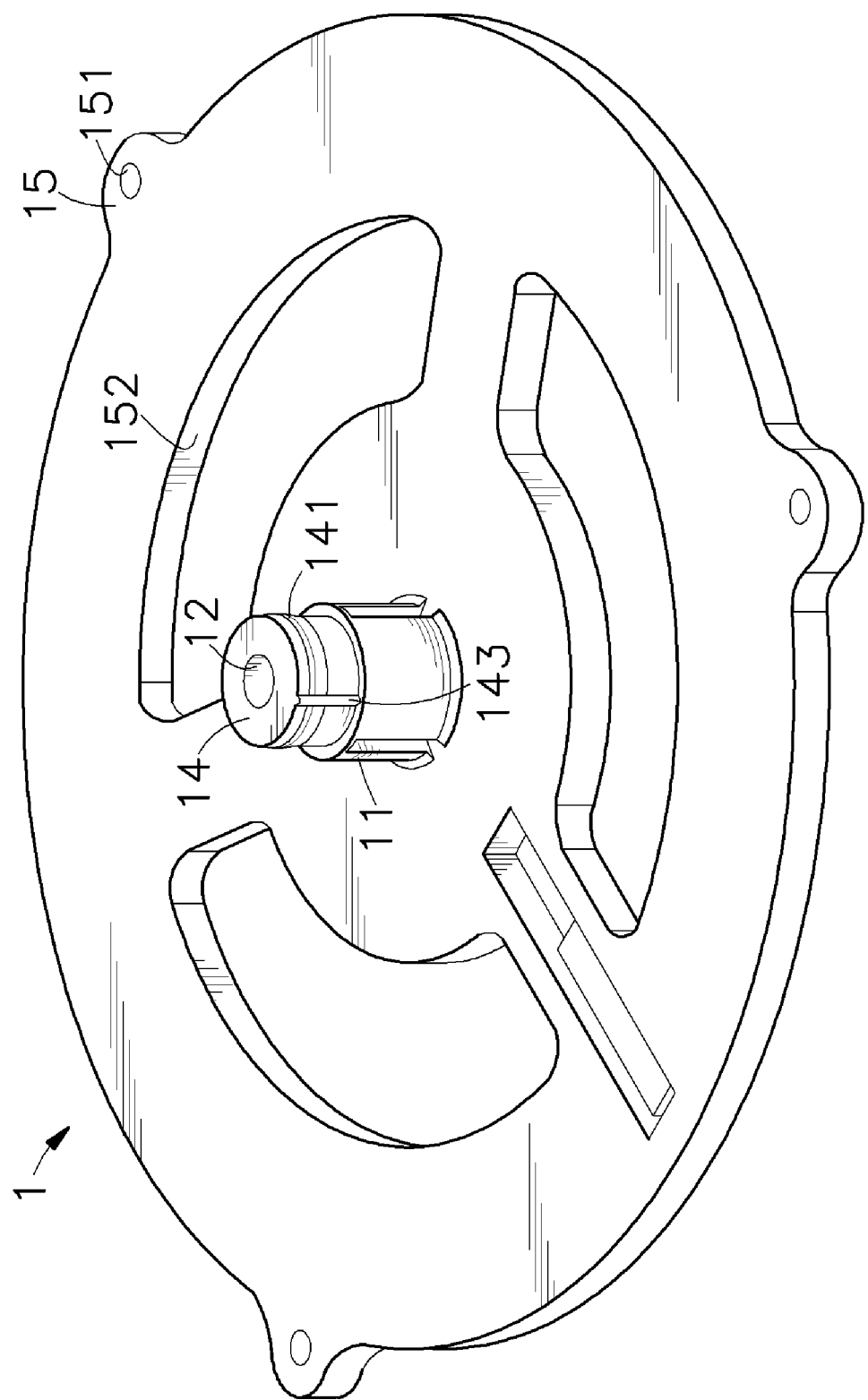
FIG. 7 is an elevational view of a bearing block for a fan bearing structure in accordance with a fourth embodiment of the present invention.
Figure 8:
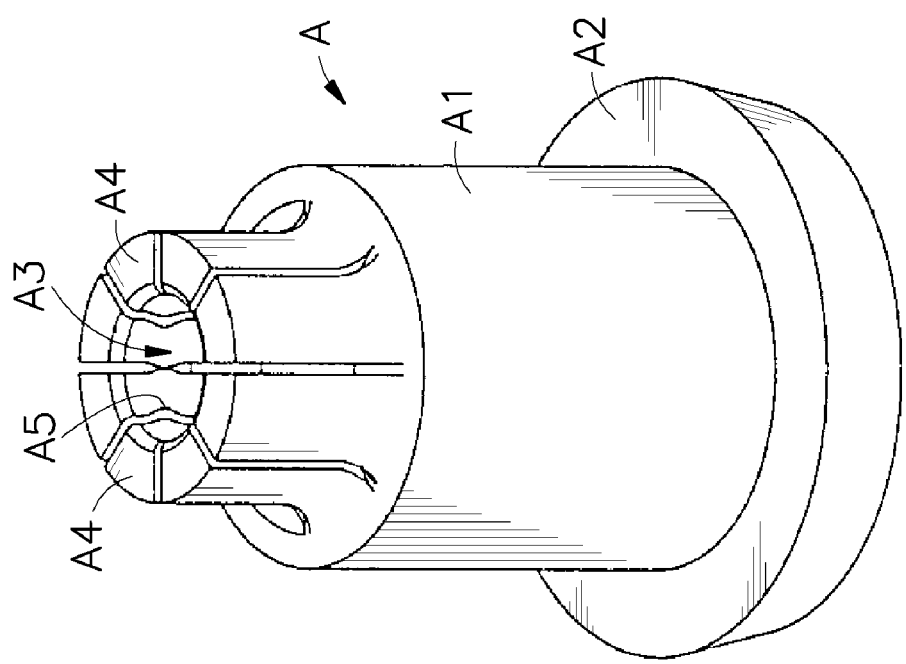
FIG. 8 is an elevational view of a bearing block for a fan bearing structure according to the prior art.
Figure 9:
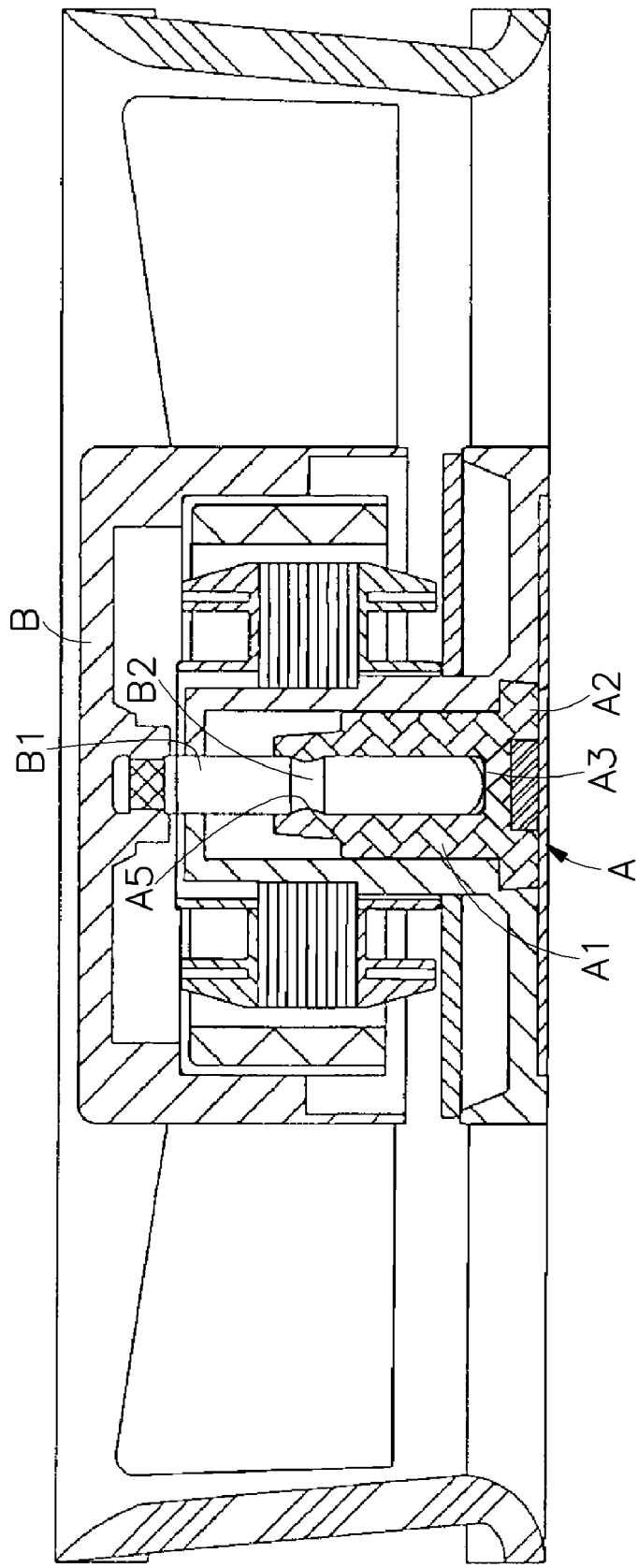
FIG. 9 is a sectional assembly view of the fan bearing structure according to the prior art.

FIG. 7 is an elevational view of a bearing block for a fan bearing structure in accordance with a fourth embodiment of the present invention. The bearing block 1 is shaped like a disk, having a plurality of mounting lugs 15 spaced around the periphery, each mounting lug 15 having a mounting through hole 151 for fixation to the fan blade assembly (not shown) with a respective fastening device to prohibit relative displacement between the bearing block 1 and the fan blade assembly, and a plurality of arched slots 152 cut through the top and bottom walls and equiangularly spaced around the stepped hub 11 for the flowing of air to dissipate heat.

As indicated above, the present invention provides a fan bearing structure, which has the following features and benefits:

1. The axle 34 of the fan blade assembly 3 is inserted into the axle hole 12 of the bearing block 1 with the neck 341 of the axle 34 coupled to the inside annular flange 121 of the stepped hub 11 of the bearing block 1, keeping the axle 34 in coincidence with the central axis of the axle hole 12 of the stepped hub 11 of the bearing block 1 constantly and assuring smooth and stable rotation of the fan blade assembly 3 relative to the stator module 2 and the bearing block 1.
2. The inside annular flange 121 is disposed at a distance far from the top opening of the axle hole 12 to support the axle 34 in coincidence with the central axis of the axle hole 12 of the stepped hub 11 of the bearing block 1; the vertical crevices 13 allows radial expansion of the stepped hub 11 to facilitate installation of the axle 34 in the axle hole 12 of the stepped hub 11, assuring positive coupling between the neck 341 of the axle 34 and the inside annular flange 121 of the stepped hub 11 for stable rotation of the fan blade assembly 3 relative to the stator module 2 and the bearing block 1.
3. In addition to the function of allowing radial expansion of the stepped hub 11, the vertical crevices 13 of the stepped hub 11 also facilitate mold stripping, preventing damage of the inside annular flange 121 by the mold when stripping the mold during fabrication of the bearing block 1. By means of the design of the vertical crevices 13, the formation of the inside annular flange 121 on the inside wall of the stepped hub 11 is simple.
4. The silicon steel plates 24 of the stator module 2 are coupled to the coupling groove 142 and stopped at between the outside stop flange 141 and relatively bigger lower part of the stepped hub 11 to prohibit vertical displacement of the stator module 2 relative to the bearing block 1, and the vertical ribs 143 of the stepped hub 11 are stopped against the silicon steel plates 24 to prohibit rotation of the stator module 2 relative to the bearing block 1.
5. The bearing block 1 is made out of a porous and oil-containing plastic material, providing an oil film for protection between the axle 34 and the inside wall of the axle hole 12 and preventing friction noises or friction heat during rotation of the fan blade assembly 3 relative to the stator module 2 and the bearing block 1.

A prototype of fan bearing structure has been constructed with the features of FIGS. 1~7. The fan bearing structure functions smoothly to provide all of the features disclosed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A fan bearing structure comprising a bearing block, a stator module fixedly mounted on said bearing block, and a fan blade assembly, said fan blade assembly comprising an axle coupled to said bearing block for allowing rotation of said fan blade assembly relative to said stator module and said bearing block upon connection of an electric current to said stator module, wherein:
    said bearing block comprises a stepped hub upwardly extending from a top side thereof, said stepped hub comprising an axle hole axially extending to a top side thereof and an inside annular flange disposed inside said axle hole and spaced below the top side of said stepped hub at a predetermined distance;
    said axle of said fan blade assembly is inserted into said axle hole of said stepped hub and kept in coincidence with the central axis of said axle hole, having a neck coupled to said inside annular flange of said stepped hub.

2. The fan bearing structure as claimed in claim 1, wherein said bearing block is made out of a porous, oil-containing plastic and expansible material, providing an oil film between said axle of said fan blade assembly and the periphery of said axle hole of said stepped hub.

3. The fan bearing structure as claimed in claim 1, wherein said stepped hub has a plurality of vertical crevices spaced around the periphery thereof in communication with said axle hole for allowing temporary deformation of said stepped hub in radial direction upon insertion of said axle into said axle hole.

4. The fan bearing structure as claimed in claim 1, wherein said inside annular flange is integrally molded with said stepped hub from a porous, oil-containing plastic and expansible material.

5. The fan bearing structure as claimed in claim 1, wherein said stepped hub has a relatively bigger lower part and a relatively smaller upper part; said stator module comprises a circuit board, an electrically insulative bracket fixedly provided at a top side of said circuit board, and a through hole cut through said circuit board and said electrically insulative bracket and coupled to the relatively smaller upper part of said stepped hub.

6. The fan bearing structure as claimed in claim 5, wherein the relatively smaller upper part of said stepped hub has a coupling groove extending around the periphery, and an outside stop flange extending around the periphery above said coupling groove; said stator module comprises a plurality of silicon steel plates fastened to said electrically insulative bracket and engaged into said coupling groove of said stepped hub and stopped between said outside stop flange and the relatively bigger lower part of said stepped hub, and a plurality of windings wound on said silicon steel plates.

7. The fan bearing structure as claimed in claim 6, wherein said stepped hub has a plurality of vertical ribs extending from the periphery thereof and stopped against said silicon steel plates to prohibit rotation of said stator module relative to said hub.

8. The fan bearing structure as claimed in claim 1, wherein said fan blade assembly comprises a hollow base block, a downwardly extending accommodation open chamber defined within said hollow base block for accommodating said stepped hub of said bearing block and said stator module, and a plurality of fan blades radially extending from said hollow base block and equiangularly spaced around the periphery of said hollow base block.

9. The fan bearing structure as claimed in claim 8, wherein said fan blade assembly further comprises magnetic means fixedly mounted inside said downwardly extending accommodation open chamber corresponding to said windings of said stator module.

10. The fan bearing structure as claimed in claim 1, wherein said axle of said fan blade assembly has a rounded bottom end disposed in spot contact with a bottom wall of said stepped hub inside said axle hole.

11. The fan bearing structure as claimed in claim 1, wherein said bearing block comprises a plurality of mounting lugs radially extending around the periphery thereof, and said mounting lugs each having a mounting through hole for mounting.

12. The fan bearing structure as claimed in claim 1, wherein said bearing block has a bottom center recess in a bottom wall thereof in vertical alignment with said axle hole, and a magnet mounted in said bottom center recess to attract said axle of said fan blade assembly in said axle hole and to keep said axle in coincidence with the central axis of said axle hole.

13. The fan bearing structure as claimed 1, wherein said bearing block has a magnet fixedly mounted in a bottom side inside said axle hole to support and attract said axle of said fan blade assembly and to keep said axle in coincidence with the central axis of said axle hole.

* * * * *